Figure 1:
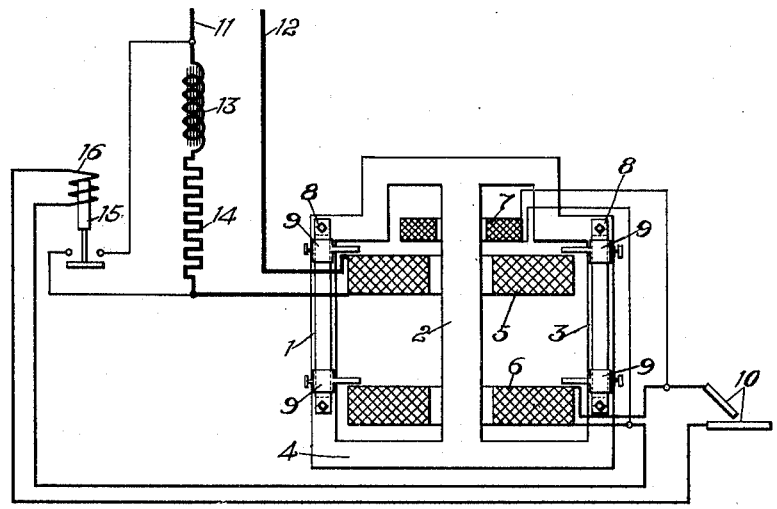

O. H. ESCHHOLZ.
ELECTRIC ARC WELDING SYSTEM.
APPLICATION FILED OCT 11, 1919.

1,343,206.

Patented June 15, 1920.

WITNESSES:
J. B. Merrill
O. E. Bee.

INVENTOR
Otto H. Eschholz
BY
Wesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,343,206.   Specification of Letters Patent.   Patented June 15, 1920.

Application filed October 11, 1919. Serial No. 330,004.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Electric-Arc-Welding Systems, of which the following is a specification.

My invention relates to arc welding systems, and, more particularly, to welding systems employing alternating current, and it has, for its primary object, the provision of alternating-current welding systems which shall possess good starting and operating characteristics.

I have found that alternating-current welding systems possess certain desirable advantages over direct-current welding systems in that they may be made lighter in weight and, therefore, more portable and their cost of installation is materially less than that of direct-current systems. However, I have found that alternating-current welding systems possess certain inherent characteristics, which, if not overcome, greatly limit the extent of their application. For example, it is relatively difficult, even for an experienced operator, to establish an arc by means of alternating current and this difficulty is believed to be occasioned by the reversals of current. I have found that the starting characteristics of an alternating-current welding system may be materially improved if either a relatively high voltage or a heavy current is employed during the period of establishing the arc.

One object of my invention, therefore, resides in the provision of welding systems in which means is employed for establishing a relatively high voltage during the period of drawing an arc and for automatically reducing the starting voltage to a normal operating value, after the arc has been drawn.

The employment of a high starting voltage facilitates the establishment of an arc, but it also introduces a shock hazard which is undesirable. Another object of my invention, therefore, resides in the provision of alternating-current welding systems in which means is employed for insuring a low open-circuit voltage to protect the operator against shocks.

In order to retain the inherent advantages of an alternating-current welding system, it is necessary to confine any additional equipment, which is employed to facilitate the establishment of an arc or to protect the operator, to a simple construction which shall not materially increase the weight or the cost of the system or add to its complication.

Another object of my invention, therefore, resides in the provision of alternating-current welding systems in which good starting and operating characteristics, together with positive protection to the operator, are obtained without the employment of complicated or expensive equipment.

With these and other objects in view, my invention will be more fully described, illustrated in the drawings, in the several views of which corresponding numerals indicate like parts, and then particularly pointed out in the claims.

Figure 2:
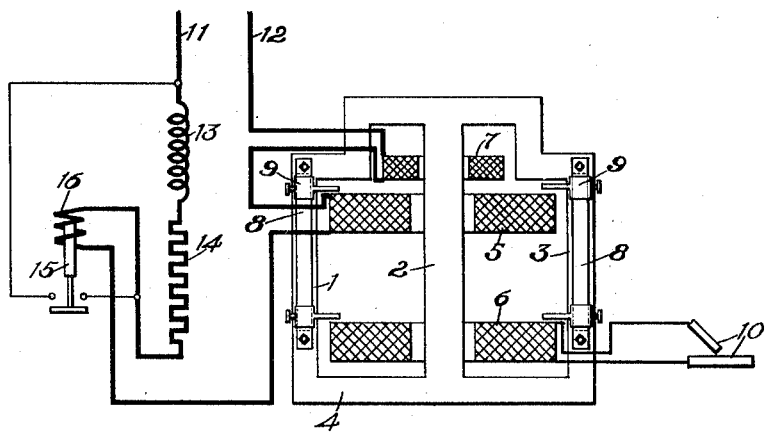

In the drawings, Figure 1 is a diagram of a welding system embodying my invention, and Fig. 2 is a similar view illustrating a modification of my invention.

In practising my invention, I provide an alternating-current welding system by employing a transformer of the constant-current type, the secondary winding of which may be directly connected to a plurality of electrodes to provide a welding circuit. The primary winding may, of course, be connected to a suitable source of alternating current and I prefer to employ an auxiliary winding which may be connected, in various ways, to either the primary or the secondary winding to cause an increase in either current or voltage, during the period of establishing the arc. The auxiliary winding may be adjustably mounted upon the core of the transformer so that, if, for example, it is connected in parallel relation to the secondary winding, the value of the starting current will be increased, and, when current flows in the secondary circuit, the auxiliary winding will be repelled, thereby causing a reduction in the starting current.

In addition to employing means for increasing either the starting voltage or the value of the initial current drawn in the welding circuit, my invention contemplates the employment of an impedance device connected in series with the primary winding and in parallel relation to a switch so controlled as to cause the impedance device to be shunted from the primary circuit under operating conditions and to be inserted in the primary circuit under open-circuit conditions. It will be appreciated that a low open-circuit voltage may be maintained by inserting an impedance device in series with the primary winding when the welding operation is interrupted. It is advantageous to employ apparatus which is entirely automatic in operation because the operator may give his entire attention to the production of strong and homogeneous welds, and, furthermore, the operator is, at all times, protected against shock hazard.

In Fig. 1 is shown a transformer comprising a core member having a plurality of legs 1, 2 and 3, the outer legs 1 and 3 of which are so formed as to provide restricted openings at one end of the core member. The other end of the core member is formed by connecting the three legs by a straight member 4. A primary winding 5 and a secondary winding 6 are adjustably mounted about the central leg 2 and an auxiliary winding 7 is so mounted about the central leg 2 as to be free to move, the auxiliary winding being preferably disposed above the primary and secondary windings. A guide 8, which is mounted upon each of the outer legs 1 and 3, carries a plurality of adjustable stops 9, by means of which the positions of the primary and secondary windings may be regulated. The secondary winding 6 is connected to a plurality of electrodes 10 and the auxiliary winding 7 is connected, in parallel relation, to the electrodes. The primary winding 5 is adapted to be connected to a suitable alternating-current supply circuit (not shown) by conductors 11 and 12. An impedance device, comprising a reactance device 13 and a resistor 14, is connected in series with the primary winding 5. A shunt circuit for the reactance device 13 and the resistor 14 is controlled by a relay switch 15 having an actuating coil 16 that is connected in series with the secondary winding 6.

Before the conductors 11 and 12 are connected to a supply circuit to energize the primary winding 5, the initial position of the primary winding is determined by adjusting the lower stops 9 carried by the guides 8. The upper stops 9 may be adjusted to any suitable position to provide for a suitable value of welding current being drawn, under welding conditions. Under open-circuit conditions of the welding system, above described, the relay switch 15 is in its open position and the reactance device 13 and the resistor 14 are, therefore, connected in series with the primary winding 5. When the conductors 11 and 12 are connected to a supply circuit, the value of the current traversing the primary circuit is limited to any desired value by employing a suitable value of impedance.

When the electrodes 10 are engaged, preliminary to establishing an arc, the actuating coil 16 is energized and the switch 15 closes to shunt the reactance device 13 and the resistor 14 from the primary circuit, thereby increasing the value of the current traversing the primary circuit. The auxiliary winding 7 rests upon the primary winding at all times, except when current traverses the secondary circuit. When the electrodes are engaged, the primary winding and the auxiliary winding 7 are both repelled from the secondary winding 6, the movement of the auxiliary winding 7 being limited by the upper end of the core member and the movement of the primary winding 5 being limited by the upper stops 9.

It will be appreciated that, when the electrodes are engaged, the value of the current traversing the primary winding is increased by shunting the impedance devices from the primary circuit and, consequently, the voltage induced across the secondary winding is increased. It will also be apparent that the auxiliary winding 7, which is closely coupled with the secondary winding when the electrodes are engaged, supplements the action of the secondary winding 6 and increases the value of the secondary current, thereby increasing the energy available at the electrodes. Good starting characteristics are, therefore, insured by making a relatively high voltage available at the electrodes, together with a suitable value of current.

Although the auxiliary winding 7 and the primary winding 5 are immediately repelled when the electrodes are engaged, the energy available at the electrodes is increased for a short time which enables an operator to more readily establish an arc. When the windings are repelled, the value of the current traversing the secondary winding is reduced to a normal operating value, determined by the adjustment of the stops 9, by the introduction of a greater leakage reactance in the transformer.

If, for any reason, the arc should be interrupted and the secondary circuit opened, the actuating coil 16 is at once deënergized and the switch 15 opens, thereby inserting the reactance device 13 and the resistor 14 in series with the primary winding 5. The value of the current traversing the primary winding is, therefore, immediately decreased and, consequently, the voltage available between the electrodes is reduced to a low value which obviates the danger of electrical shock to the operator.

It will be appreciated that various arrangements of connections for the various elements in the system above described may be employed to secure substantially the same results. As shown in Fig. 2, the auxiliary winding 7 may be connected in series with the primary winding 5, and the actuating coil 16 of the switch 15 may be connected in series with the primary winding.

Substantially the same results may be obtained, by connecting the windings as shown in Fig. 2, as in the welding system shown in Fig. 1. In this instance, however, the auxiliary winding 7, being connected in series with the primary winding, increases the voltage available across the electrodes rather than the value of current traversing the secondary circuit. Furthermore, the actuating coil 16 must be so designed that the no-load current, which traverses the primary winding, is not sufficient to energize the coil 16 to actuating the switch 15.

The operation of the system shown in Fig. 2, so far as the operator is concerned, is exactly the same as that of the system shown in Fig. 1. When open-circuit conditions obtain in the secondary circuit, the primary winding 5 rests upon the lower stops 9, which are adjusted to a suitable position, and the auxiliary winding 7 rests upon the primary winding 5. As above mentioned, the actuating coil 16 is not sufficiently energized, when the conductors 11 and 12 are connected to a supply circuit and when no current traverses the secondary winding, to close the switch 15, the reactance device 13 and the resistor 4, are, therefore, connected in series with the primary winding 5.

When the electrodes 10 are engaged, a current of higher value is drawn in the primary winding 5, and the coil 16 is energized to close the switch 15 and shunt the reactance device 13 and the resistor 14 from the primary circuit, thereby increasing the voltage available between the electrodes 10. When current traverses the secondary circuit, the primary winding 5 and the auxiliary winding 7 are immediately repelled from the secondary winding 6, the movement of the primary winding being limited by the upper stops 9 and the movement of the auxiliary winding 7 being limited by the upper end of the core member. The value of the starting voltage is raised by the action of the auxiliary winding 7 and by shunting the impedance from the primary circuit, thus facilitating the establishment of an arc.

If, for any reason, the arc is interrupted and the secondary circuit opened, no load current traverses the primary winding, and the coil 16 permits the switch 15 to open, thereby inserting the reactance device 13 and the resistor 14 in the primary circuit and reducing the voltage across the electrodes.

Obviously, means may be employed, to reduce the rate of movement of the primary winding and of the auxiliary winding when they are repelled from the secondary winding, to give the operator more time to establish an arc while the increased energy of the secondary circuit is available. Furthermore, although the primary winding is shown as movable, the position of the primary and secondary windings may be interchanged and the secondary winding be permitted to move. However, I have found that satisfactory conditions may be obtained by employing the primary winding as the movable winding because the conductors, connecting the electrodes to the secondary winding, are ordinarily less flexible than the conductors connecting the primary winding to the supply circuit.

It will be appreciated, from the foregoing description, that I have provided a relatively simple alternating-current welding system which possesses all the characteristics necessary to insure the production of strong and homogeneous welds, even by moderately skilled workmen. The additional equipment employed does not materially add to the cost of the system or increase its complication, so far as adjustments to be made by the operator are concerned.

Although I have shown and specifically described a plurality of welding systems which embody my invention, it is obvious that minor changes may be employed to provide an alternating-current welding system which possesses the characteristics accompanying the employment of the apparatus provided by my invention, and I desire, therefore, that no limitations shall be imposed except such as are indicated in the appended claims.

I claim as my invention:

1. An arc welding system comprising a transformer having primary and secondary windings, a plurality of electrodes connected to the secondary windings, means for automatically increasing the voltage between the electrodes during the period of establishing an arc and means for establishing a low open-circuit voltage between the electrodes, said means including an impedance device connected in series with the primary winding, and means for shunting the impedance device from the primary circuit controlled by the current in the secondary winding.

2. An arc welding system comprising a transformer having primary and secondary windings, an auxiliary winding connected in parallel relation to the secondary winding, a plurality of electrodes connected to the secondary winding, an impedance device connected in series with the primary winding, and means for shunting the impedance from the primary circuit when current flows in the secondary winding.

3. An arc welding system comprising a transformer having primary and secondary windings, a plurality of electrodes connected to the secondary winding, an auxiliary winding connected in parallel relation to the electrodes, an impedance device connected in series with the primary winding, a switch connected in parallel relation to the impedance device and having an actuating coil connected in series with the secondary winding.

4. An arc welding system comprising a transformer having a core member, a primary and a secondary winding adjustably mounted thereon, an auxiliary winding adjustably mounted upon the core member and connected in parallel relation to the secondary winding, a plurality of electrodes connected to the secondary winding, an impedance device connected in series with the primary winding, a switch connected in parallel relation to the impedance device and an actuating coil therefor connected in series with the secondary winding.

5. An arc welding system comprising a transformer having a core member, a primary and a secondary winding adjustably mounted thereon, an auxiliary winding adjustably mounted upon the core member and connected in parallel relation to the secondary winding, a plurality of electrodes connected to the secondary winding, an impedance device connected in series with the primary winding, a switch connected in parallel relation to the impedance device having an actuating coil connected in series with the primary winding.

6. An arc welding system comprising a transformer having a core member, a primary and a secondary winding adjustably mounted upon the core member, an auxiliary winding so mounted upon the core member as to be free to move and connected in series with the primary winding, a plurality of electrodes connected to the secondary winding, an impedance device connected in series with the primary winding, a switch connected in parallel relation to the impedance having an actuating coil connected in series with the primary winding.

7. An arc welding system comprising a transformer having primary and secondary windings, a plurality of electrodes connected to the secondary winding, means for automatically increasing the electrical energy available at the electrodes during the period of establishing an arc, and means for maintaining a low open-circuit voltage between the electrodes, said means including an impedance device connected in series with the primary winding.

In testimony whereof, I have hereunto subscribed my name this 30th day of Sept. 1919.

OTTO H. ESCHHOLZ.